Jan. 23, 1940.       W. H. BASELT ET AL       2,188,260
             BRAKE ARRANGEMENT
           Filed Nov. 18, 1937      4 Sheets-Sheet 1
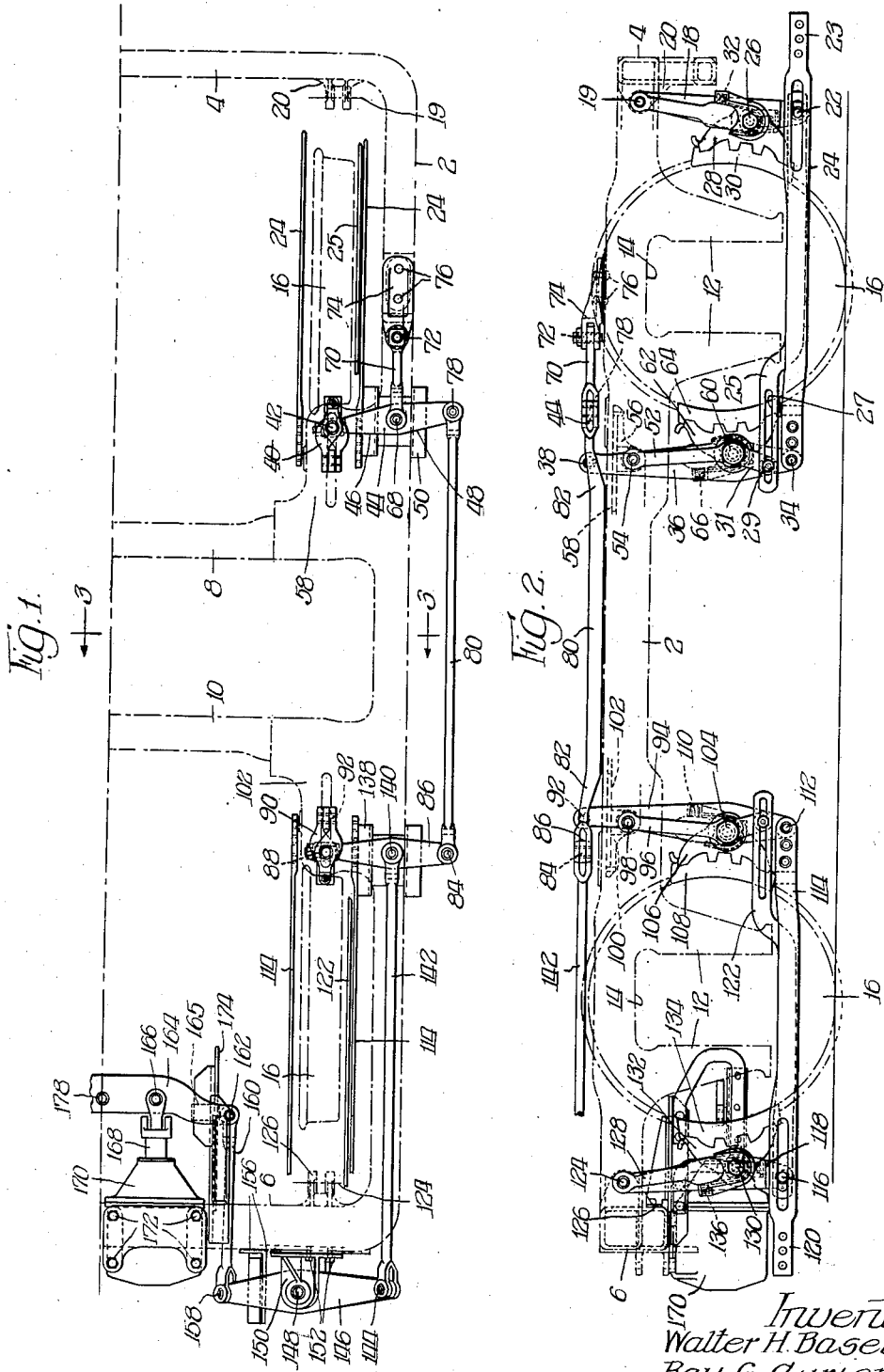
Inventors
Walter H. Baselt,
Ray G. Curien,
By Orrin O. B. Garner
                  Atty.

Jan. 23, 1940.    W. H. BASELT ET AL    2,188,260
BRAKE ARRANGEMENT
Filed Nov. 18, 1937    4 Sheets-Sheet 2
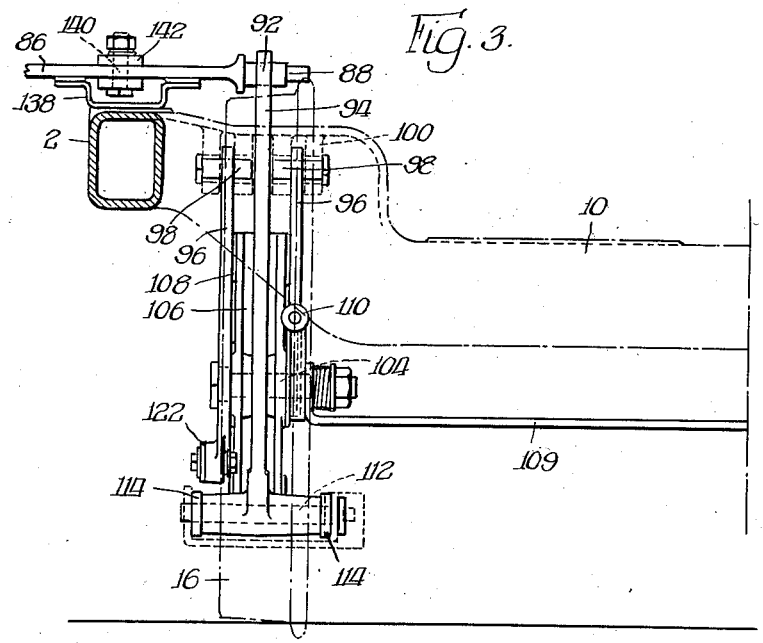
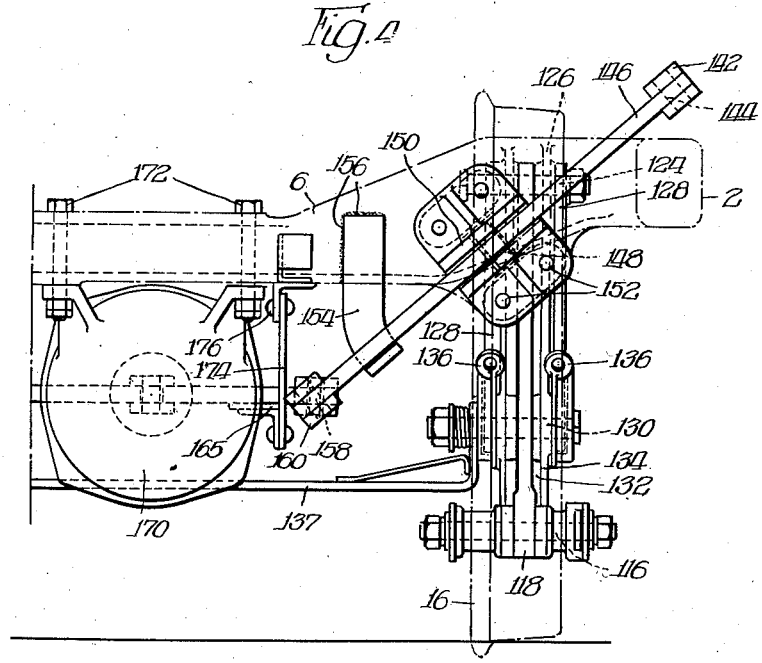
Inventors:
Walter H. Baselt,
Ray. G. Aurien,
By Orrin O. B. Garner
Atty.

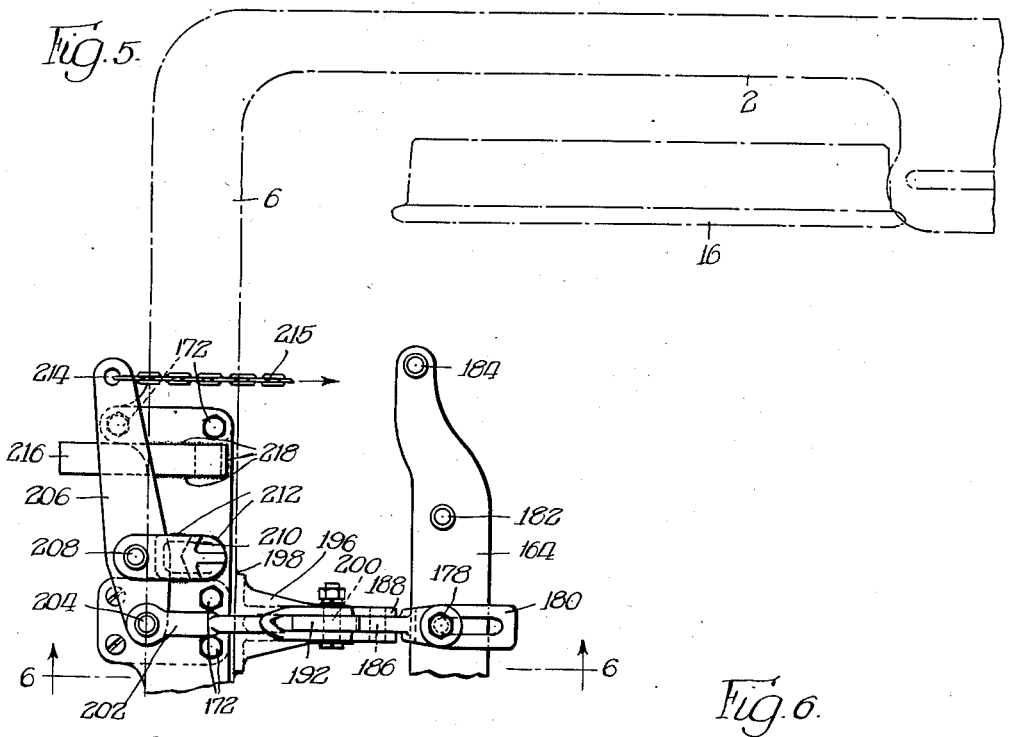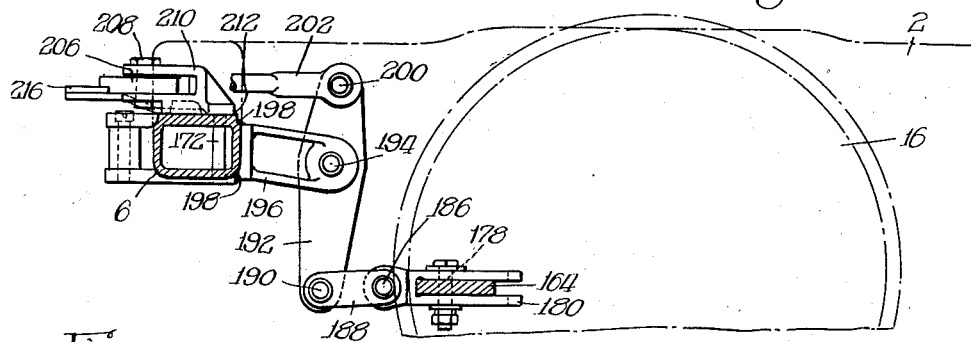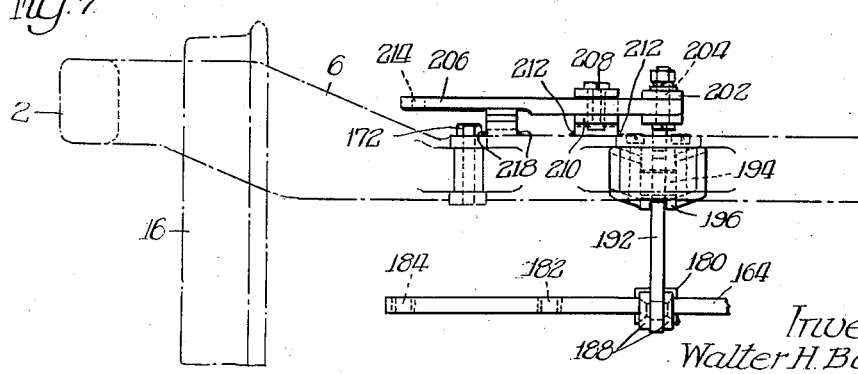

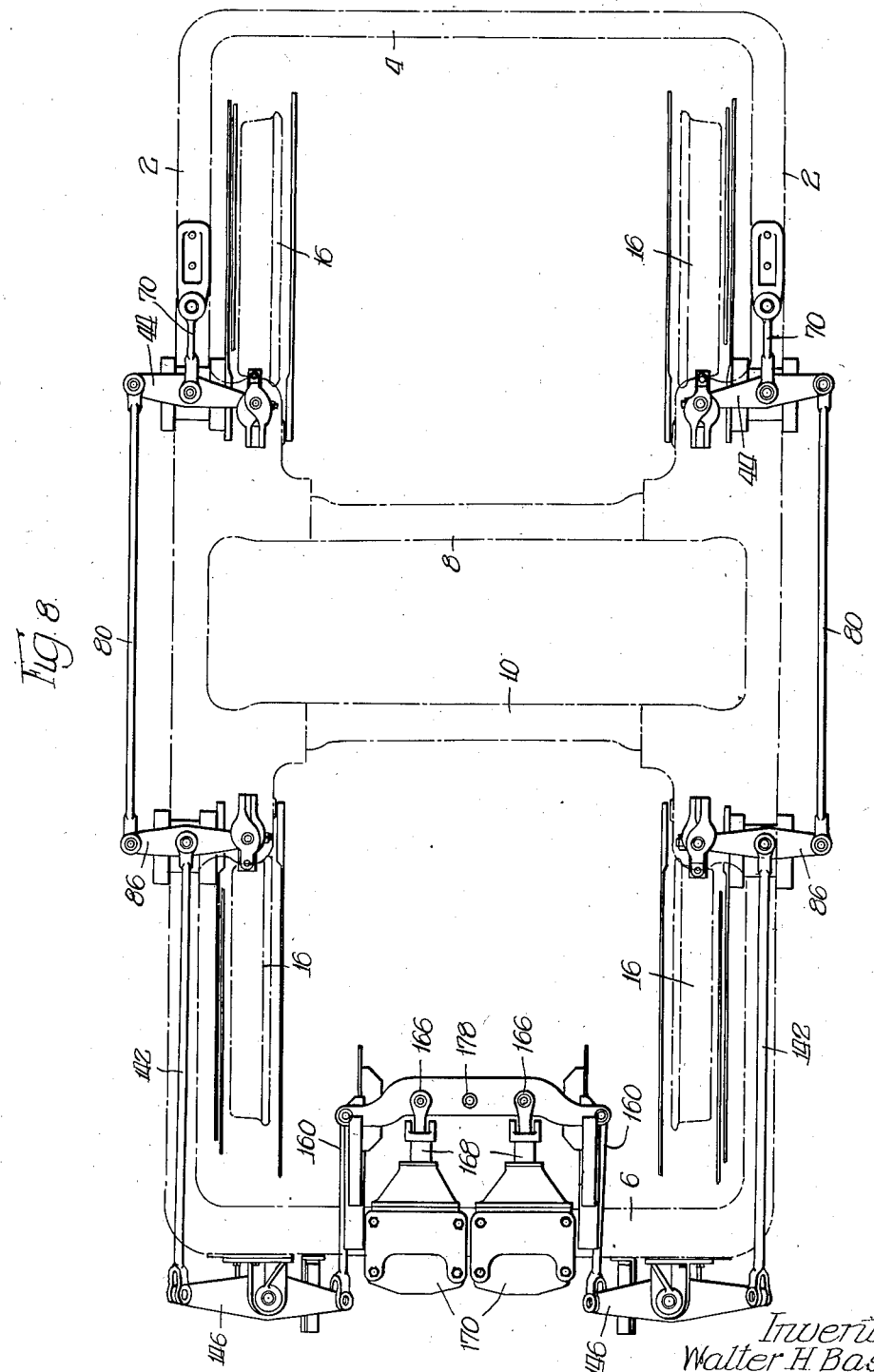

Patented Jan. 23, 1940

2,188,260

UNITED STATES PATENT OFFICE 2,188,260

BRAKE ARRANGEMENT

Walter H. Baselt and Ray G. Aurien, Chicago, Ill., assignors to American Steel Foundries, Chicago, Ill., a corporation of New Jersey Application November 18, 1937, Serial No. 175,237

8 Claims. (Cl. 188—56)

Our invention relates to brake rigging for railway cars and more particularly to a novel type of rigging for a truck utilized on more recent designs of high-speed trains.

It is an object of our invention to design a type of rigging for association with a high-speed truck wherein maximum clearance conditions will be permitted for the associated car body.

It is a further object of our invention to design such a novel type of rigging wherein may be conveniently associated hand brake means for operating the rigging in case of emergency failure of the usual power means.

There is further contemplated in our invention a brake rigging of the beamless clasp type wherein dual power means will be supported from one end rail for operation of the brake rigging, leaving the other end of the truck substantially free of rigging between the wheels thereof.

Other novel features incorporated in our brake structure will be apparent from a consideration of the following specification describing the accompanying drawings and from the appended claims.

In the drawings wherein, for the sake of clarity, details are omitted from certain figures when better shown in others—

Figure 1 is a top plan view of a truck and brake structure embodying our invention, only one half of the truck structure being shown inasmuch as the rigging is similar at opposite sides of the truck;

Figure 2 is a side elevation of the truck and brake structure shown in Figure 1;

Figure 3 is a vertical section taken at the transverse center line of the truck and substantially in the plane as indicated by the line 3—3 of Figure 1;

Figure 4 is an end view of the truck and brake structure shown in Figures 1 and 2, the view being taken from the left as seen in those figures;

Figure 5 is a top plan view of the novel form of connection for hand brake means associated with our brake structure;

Figure 6 is a longitudinal sectional view through the structure shown in Figure 5, the section being taken substantially in the plane indicated by the line 6—6 of Figure 5;

Figure 7 is a fragmentary end elevation of the structure shown in Figures 5 and 6; and Figure 8 is a top plan view of an entire truck and brake arrangement embodying our invention. The view in this figure corresponds in general to Figure 1, except that in Figure 8 the entire braking arrangement is shown and certain of the reference characters are omitted.

Describing our novel structure in more detail, the truck structure comprises the side rail 2 with integral end rails 4 and 6 and the centrally located spaced transoms 8 and 10 forming a means of connection to the bolster which supports the car body. The side rail has the pedestal jaws 12, 12 forming therebetween the journal openings 14, 14 comprising the usual manner of connection to the journal portions (not shown) of the associated wheel and axle assemblies 16, 16. Upon the said journal portions may be supported equalizers (not shown) of the conventional type upon which may be seated the usual spring means providing support for the side rails 2 in the ordinary manner.

The brake rigging comprises the hanger lever 18 (Figure 2, right) pivotally hung as at 19 from the bracket 20 on the end rail 4, the lower end of said hanger lever having a pivotal connection as at 22 with the paired inner and outer straps 24, 24, said connection being made adjustable as by the shim type slack adjuster indicated at 23 and comprising the adjuster bar 25 whose opposite end is slotted as at 27 to provide an adjustable connection as at 29 with the bracket 31 in a manner well known. Intermediate its ends, the hanger lever 18 pivotally supports as at 26 the brake head 28 with its associated brake shoe 30, the pivotal position of said brake head on said hanger being controlled by the balance arrangement 32 of well known type. The opposite ends of the straps 24, 24 have a pivotal connection as at 34 to the lower end of the live truck lever 36, the upper end of said live truck lever having a pivotal connection as at 38 to the universal links 40 whose opposite ends have a pivotal connection as at 42 to the trunnion end of the dead equalizing lever 44 which is slidably supported as at 46 and 48 over the side rail 2 on the outturned flanges of the strap 50 which may be welded or otherwise secured on the top of said side rail. The rigging intermediate the wheels is supported by the paired hangers 52 hung from their upper ends as at 54 from the bracket 56 integrally formed with the gusset 58 reinforcing the juncture of the side rail 2 with the transom 8. The lower ends of the hangers 52 have a pivotal connection as at 60 intermediate the ends of the live truck lever 36, and also supported at said pivotal point 60 is the brake head 62 with the associated brake shoe 64, balancing means 66 of well known form being provided for said brake head.

The dead equalizing lever 44 is fulcrumed intermediate its ends as at 68 from the link 70 whose opposite end is pivotally connected as at 72 to the bracket 74 secured on the top of the side rail as at 76, 76. The outer end of the equalizing lever 44 has a pivotal connection as at 78 to the pull rod 80, the central portion of which is offset downwardly as most clearly seen at 82, 82 in Figure 2. The opposite end of said pull rod 80 has a pivotal connection as at 84 to the outer end of the live equalizing lever 86, said live equalizing lever having its inner trunnion end pivotally connected as at 88 to the universal link means 90, the opposite end of said link means having a pivotal connection as at 92 to the upper end of the live truck lever 94, said lever 94 being supported by the paired hangers 96, 96, said hangers having their upper ends pivotally hung as at 98 from the bracket 100 integrally formed with the gusset 102 reinforcing the juncture of the side rail 2 with the transom 10. The lower ends of the paired hangers 96 are pivotally connected as at 104 to a point intermediate the ends of the live truck lever 94, and at the said pivotal point is likewise supported the brake head 106 with the associated brake shoe 108 as well as the brake head tie strap 109 (Figure 3), the opposite end of said tie strap having a similar connection with the brake head at the opposite side of the truck, the rotative position of said head being controlled as by the balancing means 110. The lower end of the live truck lever 94 has a pivotal and adjustable connection as at 112 to the paired inner and outer straps 114, 114, the opposite ends of said straps having a pivotal and adjustable connection as at 116 to the lower end of the hanger lever 118, said adjustable connection involving the slack adjuster indicated at 120 and the adjuster bar indicated at 122. The upper end of the hanger lever 118 has a pivotal connection as at 124 to the bracket 126 integrally formed on the end rail 6, and likewise at the pivotal point 124 are connected the upper ends of the paired hanger 128, the lower ends of said hangers having a pivotal connection as at 130 to a point intermediate the ends of the hanger lever 118 at which point is also supported the brake head 132 with the associated brake shoe 134, the rotative position of said head being controlled by the balance means 136. Also at the pivotal point 130 is connected one end of the brake head tie strap 137 (Figure 4), its opposite end being similarly connected to the rigging at the opposite side of the truck.

The live equalizing lever 86 is slidably supported over the side rail 2 on the out-turned flanges of the bracket 138 and said lever has a pivotal connection intermediate its ends as at 140 to the pull rod 142 whose opposite end is pivotally connected as at 144 to the diagonally arranged auxiliary lever 146, said auxiliary lever being fulcrumed intermediate its ends as at 148 from the bracket 150 which may be secured to the frame adjacent the juncture of the side frame 2 and the end rail 6 as at 152, 152. The diagonally arranged auxiliary lever 146 is further guided and supported by the bracket 154 which may be welded to the frame as indicated at 156. The inner and lower end of the auxiliary lever 146 has a pivotal connection as at 158 to the pull rod 160. The opposite end of the pull rod 160 has a pivotal connection as at 162 to the end of the cylinder equalizer 164, said equalizer having a pivotal connection adjacent one end as at 166 to the piston 168 of the cylinder 170 which may be supported, as likewise its companion cylinder at the opposite side of the truck center line, below the end rail 6 as by the bolt and nut assemblies 172, 172. The equalizer 164 is supported adjacent its end on the wear plate 165 by the angle iron and strap bracket indicated at 174, said bracket being supported from the end rail 6 as indicated at 176. The mid-point of the equalizer 164 has a pivotal connection as at 178 to the swivel jaw 180 (Figure 5) having a purpose to be hereafter more fully described and adjacent its opposite end the equalizer 164 has a pivotal connection as at 182 (Figure 5) similar to that shown at 166 with the companion cylinder (not shown) mounted on the end rail adjacent the cylinder 170, but on the opposite side of the longitudinal center line of the truck, the opposite end of the equalizer likewise having a pivotal connection as at 184 to a pull rod similar to the pull rod 160 and the latter to an auxiliary lever similar to the auxiliary lever 146, but at the opposite side of the truck.

Our novel hand brake arrangement is shown in detail in Figures 5, 6 and 7 wherein it may be observed that the equalizer 164 has a pivotal connection as at 178 to the swivel jaw 180, said swivel jaw having its opposite end pivotally connected as at 186 to the links 188, the opposite end of said links having a pivotal connection as at 190 to the lower end of the vertical dead lever 192, said dead lever being fulcrumed intermediate its ends as at 194 from the bracket 196 which may be secured on the inner face of the end rail 6 as by welding indicated at 198, 198. The upper end of the fulcrum lever 192 has a pivotal connection as at 200 to the pull rod 202 and the opposite end of said pull rod has a pivotal connection as at 204 to one end of the hand brake lever 206, said hand brake lever being fulcrumed intermediate its ends as at 208 from the bracket 210 which may be secured on the top of the end rails 6 as by welding indicated at 212, 212. The outer end of the hand brake lever 206 may have a pivotal connection as at 214 to the flexible cable 215 leading to the usual hand brake sheave. The outer end of the hand brake lever may be supported by the strap 216 welded to the top of the end rail 6 as indicated at 218, 218.

In operation, assuming the parts to be in released position, actuation of the power means 170 and its companion power means causes the equalizer 164 to move to the right as viewed in Figure 1, thus moving to the right the pull rod 160 and rotating the diagonally arranged auxiliary lever 146 in a clockwise direction about the fulcrum intermediate its ends and causing movement of the pull rod 142 to the left (Figures 1 and 2). Such movement of the pull rod 142 causes counter-clockwise rotation of the live equalizing lever 86 about the fulcrum 84 at its outer end, thus applying the brakes on opposite sides of the adjacent wheel in a manner well known to the art. Continued actuation causes the live equalizing lever 86 to rotate in a clockwise direction about the fulcrum at its inner end, thus moving the pull rod 80 to the left and rotating the dead equalizing lever 44 in a clockwise direction and applying the brakes to the wheel at the opposite end of the truck in a similar manner. Release of the power means causes the parts to move in directions reverse to those just described, thus releasing the brakes.

In case of failure of the power means, the hand brake mechanism may be operated as follows. Rotation of the hand brake sheave will cause movement to the right of the flexible cable 215 wound thereon and attached at 214 as previously described, this rotating in a clockwise direction the hand brake lever 206 about the fulcrum 208 intermediate its ends, causing movement to the left of the pull rod 202 and rotating the fulcrum lever 192 in a counter-clockwise direction about the fulcrum 194 intermediate its ends thus applying movement of translation to the right to the cylinder equalizer 164 through the swivel double jaw 180 and applying the brakes in the manner above described for power operation. Rotation of the hand brake sheave in the reverse direction will permit release of the brakes.

It is to be understood that we do not wish to be limited by the exact embodiments of the device shown which are merely by way of illustration and not limitation as various and other forms of the device will of course be apparent to those skilled in the art without departing from the spirit of the invention or the scope of the claims.

We claim:

1. In a railway truck a frame having side members and integral end rails, dual power means mounted on an end rail, supporting wheel and axle assemblies, a cylinder equalizer connected to said power means, said equalizer having its opposite ends operatively connected to auxiliary levers mounted adjacent opposite corners of said frame at said end rail, and brake rigging for the wheels at opposite sides of the truck comprising interconnected live and dead equalizing levers supported on each side member and connected respectively to clasp brake means associated with adjacent wheels, said live levers having points intermediate their ends operatively connected respectively to said auxiliary levers, each of said dead equalizing levers having a swinging fulcrum connection with the adjacent side member, and brackets on said end rail affording sliding support for said auxiliary levers outwardly thereof and for said equalizer inwardly thereof.

2. In a railway truck a frame having an end rail, dual power means mounted on said end rail, wheel and axle assemblies, a cylinder equalizer connected to the pistons of said power means, auxiliary levers fulcrumed on said end rail on opposite sides of said power means, said auxiliary levers having their inner ends connected to opposite ends of said equalizer and their outer ends operatively connected to braking means associated with wheels at the opposite sides of the truck, said braking means comprising dead truck levers outwardly of the wheels, live truck levers intermediate the wheels, straps connecting the lower ends of said levers for each wheel, live and dead equalizing levers having their outer ends connected to each other and their inner ends connected respectively to said live truck levers, and an operative connection between said live equalizing lever and the adjacent auxiliary lever, and brackets on said end rail affording sliding support for said auxiliary levers outwardly thereof and for said equalizer inwardly thereof.

3. In a railway truck a frame having side members and integral end rails, dual power means mounted on an end rail, supporting wheel and axle assemblies, a cylinder equalizer connected to said power means, said equalizer having its opposite ends operatively connected to auxiliary levers mounted adjacent opposite corners of said frame at said end rail, and brake rigging for the wheels at opposite sides of the truck comprising interconnected live and dead equalizing levers supported on each side member and connected respectively to clasp brake means associated with adjacent wheels, said live levers having points intermediate their ends operatively connected respectively to said auxiliary levers, and brackets on said end rail affording sliding support for said auxiliary levers outwardly thereof and for said equalizer inwardly thereof.

4. In a railway truck a frame having an end rail, dual power means mounted on said end rail, wheel and axle assemblies, a cylinder equalizer connected to the pistons of said power means, and auxiliary levers fulcrumed on said end rail on opposite sides of said power means, said auxiliary levers having their inner ends connected to opposite ends of said equalizer and their outer ends operatively connected to braking means associated with wheels at the opposite sides of the truck, said braking means comprising interconnected live and dead equalizing levers connected respectively to clasp brakes associated with adjacent wheels, said live equalizing lever being operatively connected to the adjacent auxiliary lever, and brackets on said end rail affording sliding support for said auxiliary levers outwardly thereof and for said equalizer inwardly thereof.

5. In brake rigging for a railway truck a frame comprising an end rail, a plurality of power means mounted on said end rail, wheel and axle assemblies, auxiliary levers fulcrumed on said end rail on opposite sides of said power means, a cylinder equalizer having its opposite ends operatively connected to said auxiliary levers and points adjacent its opposite ends connected to said power means, braking means associated with the wheels at opposite sides of the truck, operative connections between said braking means and said auxiliary levers respectively, and hand brake means operatively connected to said cylinder equalizer at the mid-point thereof, and a plurality of brackets on said end rail affording sliding support for the inner ends of said auxiliary levers and affording sliding support for the opposite ends of said equalizer intermediate the points of connection of said equalizer to said power means and said auxiliary levers at opposite ends thereof respectively.

6. In a railway truck a frame having an end rail, dual power means hung from said end rail, wheel and axle assemblies, a cylinder equalizer connected to the pistons of said power means, and auxiliary levers fulcrumed on said end rail on opposite sides of said power means, said auxiliary levers having their inner ends connected to opposite ends of said equalizer and their outer ends operatively connected to braking means associated with wheels at the opposite sides of the truck, and a plurality of brackets on said end rail affording sliding support for the inner ends of said auxiliary levers and affording sliding support for said cylinder equalizer at spaced points intermediate said piston connections and said auxiliary lever connections.

7. In a railway car truck, a frame comprising a transverse member, dual power means supported from said member on opposite sides of the longitudinal center line of said truck, an equalizer connected adjacent its opposite ends respectively to said power means, supporting wheel and axle assemblies, clasp brake means associated with said wheels, auxiliary levers supported on said transverse member outwardly of said power means respectively and connected to opposite ends of said equalizer, and an operative connection between the brake means at each side of the truck and said auxiliary levers respectively, a plurality of brackets supported from said end rail and affording sliding support respectively for the inner ends of said auxiliary levers outwardly of said end rail, and a plurality of brackets on said end rail intermediate said first-mentioned brackets affording sliding support for spaced points of said equalizer inwardly of said end rail.

8. In a railway car truck, a frame having a transverse member, supporting wheel and axle assemblies, a plurality of power means supported on said member on opposite sides of the longitudinal center line of said truck, an equalizer having points adjacent its opposite ends connected to said power means respectively, fulcrum means supported on said member adjacent opposite ends thereof, auxiliary levers pivoted in said fulcrum means respectively and connected at their inner ends to opposite ends of said equalizer, clasp brake means associated with said wheels, and an operative connection between the brake means at each side of the truck and said respective auxiliary levers, a plurality of brackets supported from said end rail and affording sliding support respectively for the inner ends of said auxiliary levers outwardly of said end rail, and a plurality of brackets on said end rail intermediate said first-mentioned brackets affording sliding support for spaced points of said equalizer inwardly of said end rail.

WALTER H. BASELT.
RAY G. AURIEN.